2 Sheets--Sheet 1.

R. C. GRAY & W. B. BRITTINGHAM.
Water-Meters.

No. 133,438. Patented Nov. 26, 1872.

Witnesses
Inventor

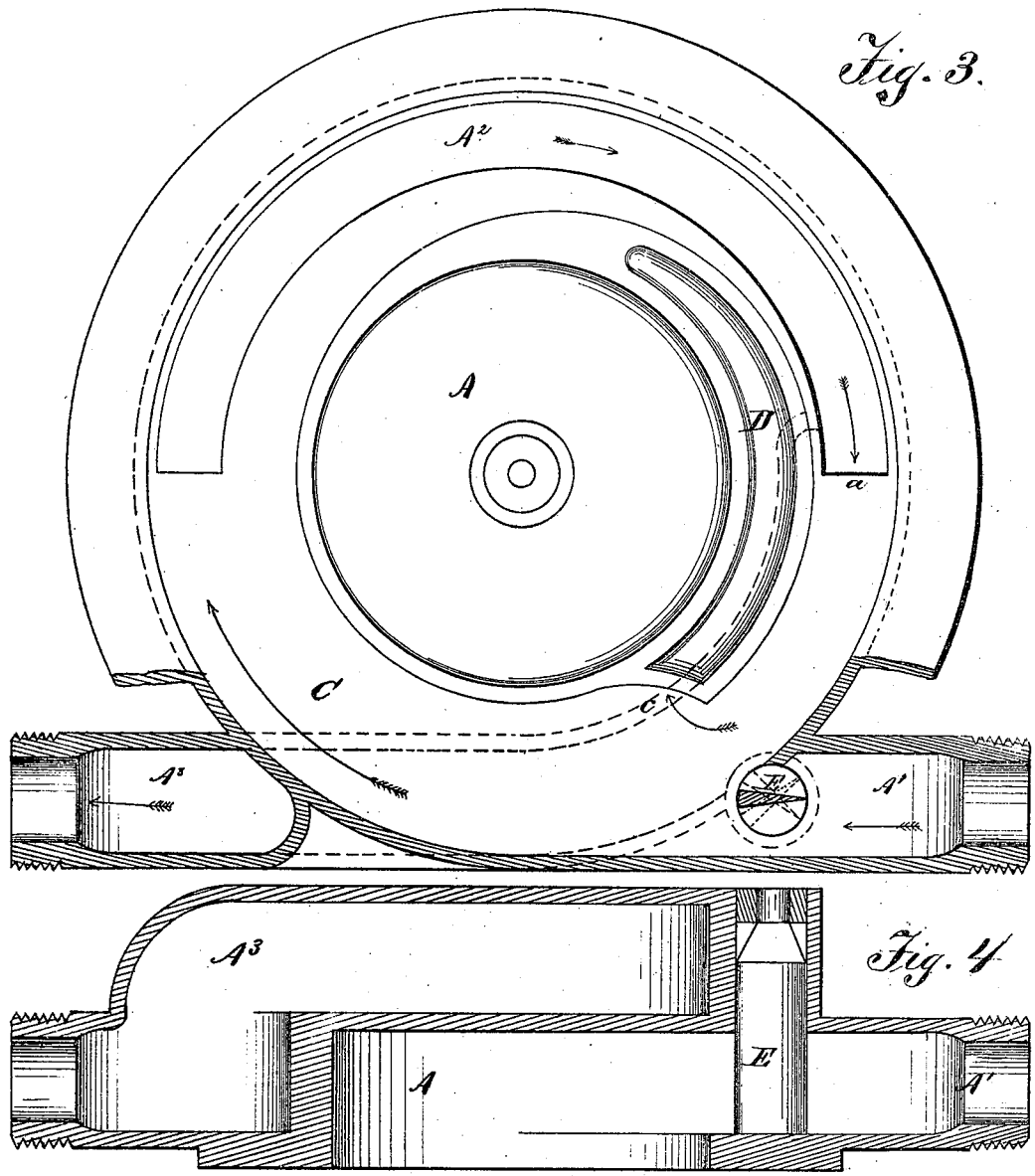

UNITED STATES PATENT OFFICE.

ROBERT C. GRAY AND WILLIAM B. BRITTINGHAM, OF NEW YORK, N. Y., ASSIGNORS TO HENRY W. PUTNAM, OF BENNINGTON, VERMONT.

IMPROVEMENT IN WATER-METERS.

Specification forming part of Letters Patent No. 133,438, dated November 26, 1872.

*To all whom it may concern:*

Be it known that we, ROBERT C. GRAY and WILLIAM B. BRITTINGHAM, residing at New York, in the county of New York and State of New York, have invented certain Improvements in Water-Meters, of which the following is a specification:

This invention relates to that class of water-meters in which the volume of water passing through the meter is ascertained from the number of revolutions of a paddle-wheel which is rotated by the current of the water and records the number of its revolutions, or the volume of water discharged deduced therefrom, upon a suitable register. Our improvement consists, first, in the employment of a scroll-channel in connection with the paddle-wheel for the purpose of relieving the floats of the latter as far as possible from the action of the back-water; and, secondly, in the employment, in combination with the foregoing elements, of a valve or deflector for regulating the velocity of the wheel by governing the direction of the incoming current of water.

Figure 1:
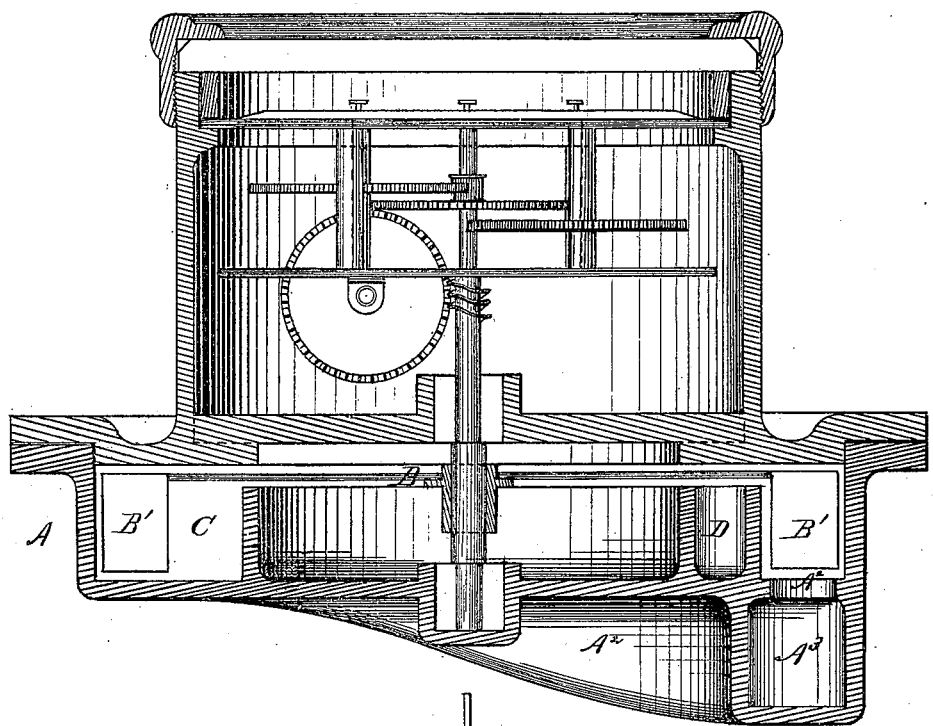
Figure 2:
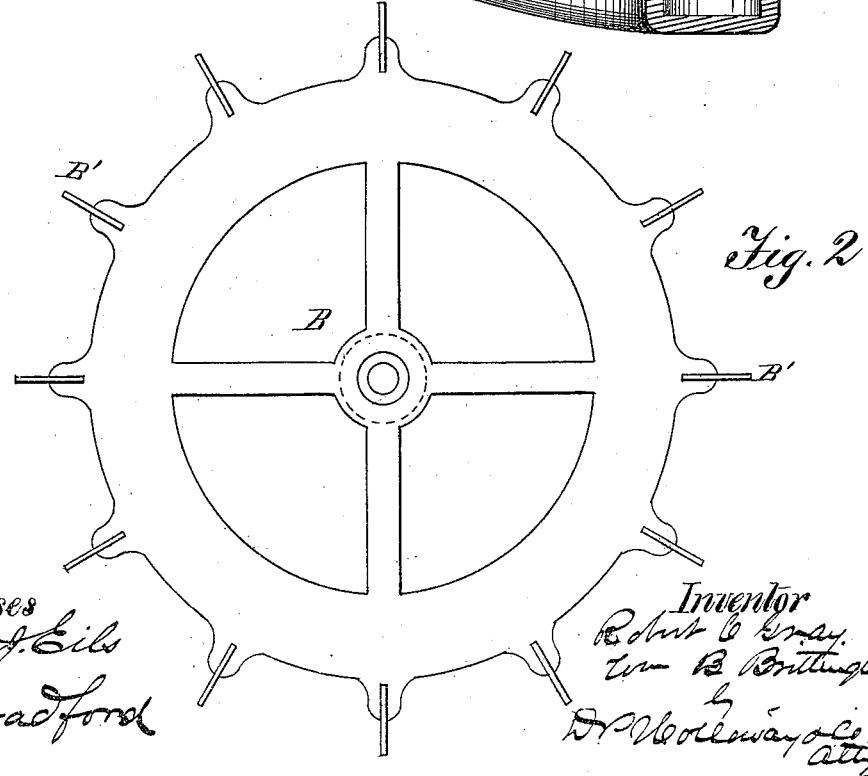

Figure 1 is an axial section of our improved water-meter complete. Fig. 2 is a plan of the wheel detached. Fig. 3 is a sectional plan of the wheel-case, the top having been removed to better illustrate the scroll-channel, abutment, and exhaust-port. Fig. 4 is a transverse section of the wheel-case.

The same letters of reference are employed in all the figures in the designation of identical parts.

The water enters the case A, which contains the measuring-wheel B, through the induction-pipe $A^1$, and is directed through the annular channel C to the exhaust-port $A^2$, from which it flows into the eduction-pipe $A^3$, as indicated by the arrows in Fig. 3. The channel C is about twice the width of the floats $B'$ of the wheel for about the one-fourth of its circumference, beginning at a point opposite to the induction aperture, and is then gradually contracted to nearly the width of such floats by means of a scroll-abutment, D, which terminates abruptly opposite to the induction aperture. The floats or buckets of the wheel rotate in close proximity to the outer wall of the channel, which is circular, as shown. The exhaust-port $A^2$ is a spiral passage beginning at the surface of the bottom of the channel at a point opposite to where the scroll-abutment begins and running around about one-half the circumference of the channel, gradually deepening until it merges beneath the bottom of the channel in the exhaust or eduction pipe $A^3$. This form of the port thus compensates for the contraction of the channel by the scroll-abutment, and avoids any choking action of the water by reason of the latter. The scroll-abutment, contracting the channel C to its minimum width between the end $a$ of the exhaust-port and the induction aperture, thereby reduces the volume of water to be displaced or carried around this stretch of the channel by the floats to a minimum, and the sudden widening of the channel at the termination of the scroll-abutment nearly relieves the wheel altogether from the retarding action of this back-water, which deflects toward the center and into the part of the channel marked $c$. A valve or deflector, E, is arranged in the induction-pipe where it opens into the case, consisting of a single wing which may be turned by means of any suitable instrument from the outside of the meter to present its faces or flat sides at different angles to the incoming current of water, and thus deflect the stream more or less from a tangential direction, (which is the normal direction in which the current enters the channel C of the case,) or obstruct its free flow. By changing the position of this valve the velocity of the wheel can be regulated. The wheel-shaft $B^2$ protrudes through the cover of the case A, and is provided with suitable gearing to set in motion a registering mechanism, which is properly inclosed in a case superimposed upon case A, all as illustrated in Fig. 1.

What we claim as our invention, and desire to secure by Letters Patent, is—

1. The combination of the wheel B and scroll-channel C, substantially as specified.

2. The combination of the wheel B, scroll-channel C, and spiral exhaust-port $A^2$, substantially as and for the purpose specified.

3. The scroll-abutment D, arranged with reference to the induction aperture and exhaust-port, substantially as and for the purpose specified.

4. The combination of the wheel B, scroll-channel C, spiral exhaust-port A², and deflector E, substantially as specified.

In testimony whereof we have signed our names to this specification in the presence of two subscribing witnesses.

ROBT. C. GRAY.
WILLIAM B. BRITTINGHAM.

Witnesses:
T. S. W. TITUS,
JOHN J. QUILLE.